Nov. 14, 1944.   D. L. COSPER   2,362,453
VEHICLE CAB
Filed Oct. 25, 1941   4 Sheets-Sheet 1
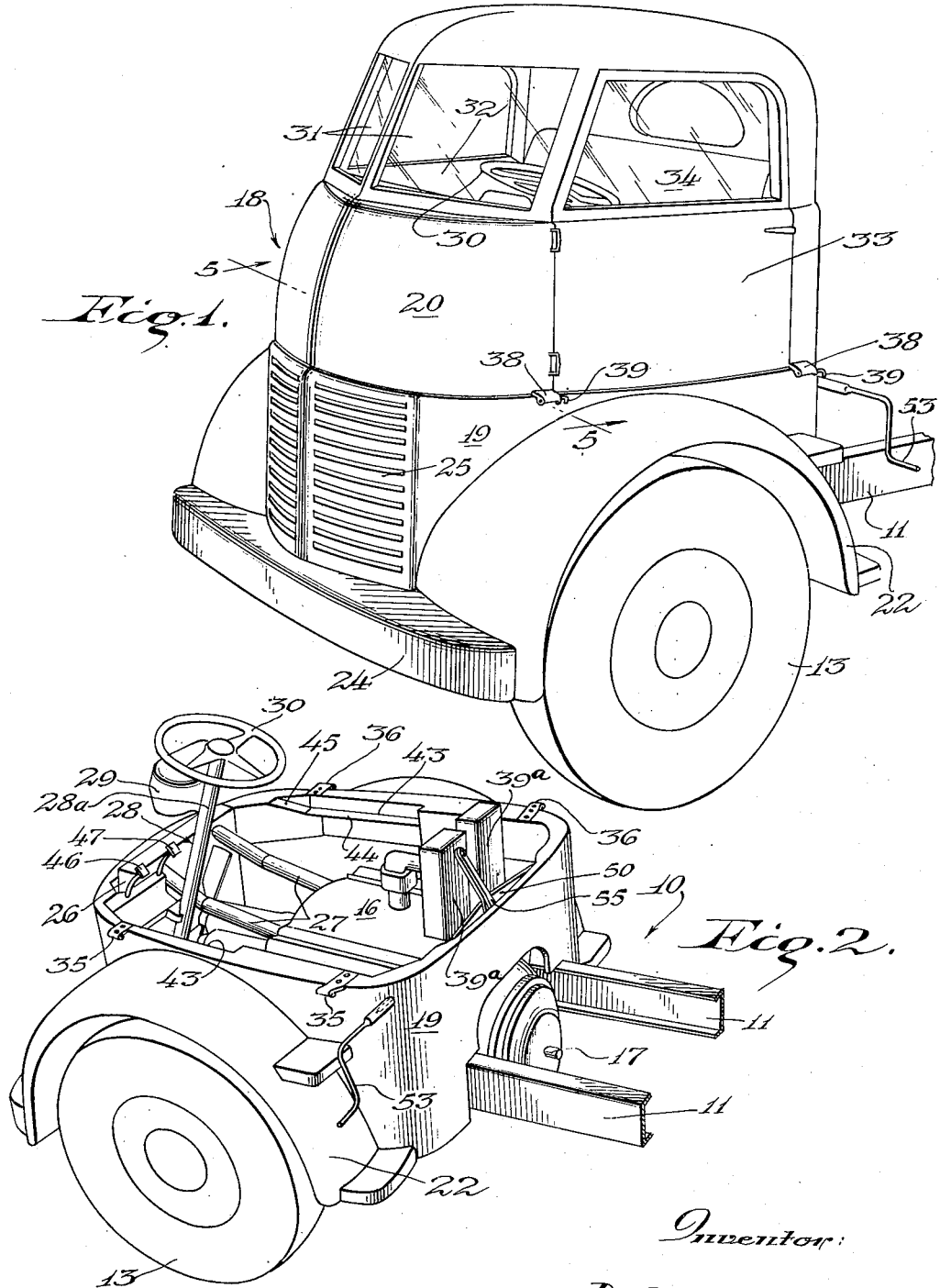
Inventor:
Dale L. Cosper
By Paul O. Pippel
Attorney Nov. 14, 1944.     D. L. COSPER     2,362,453
VEHICLE CAB
Filed Oct. 25, 1941     4 Sheets-Sheet 2
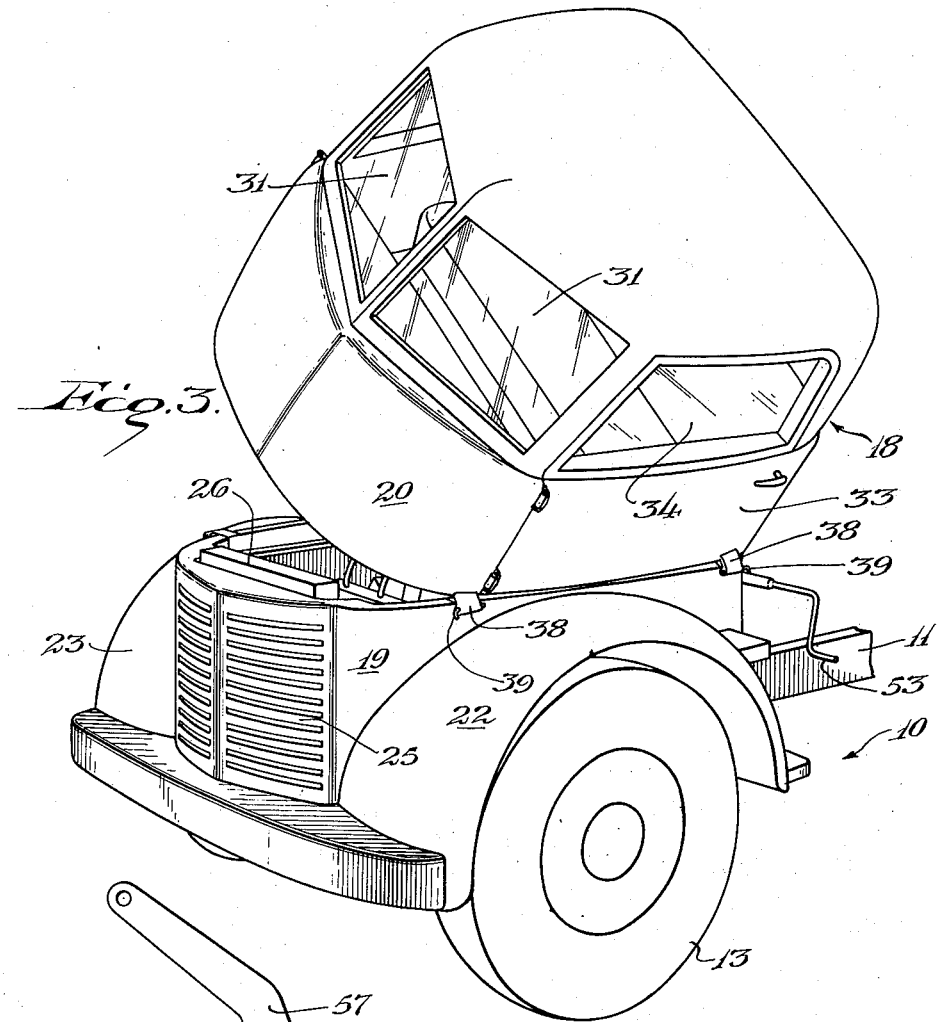
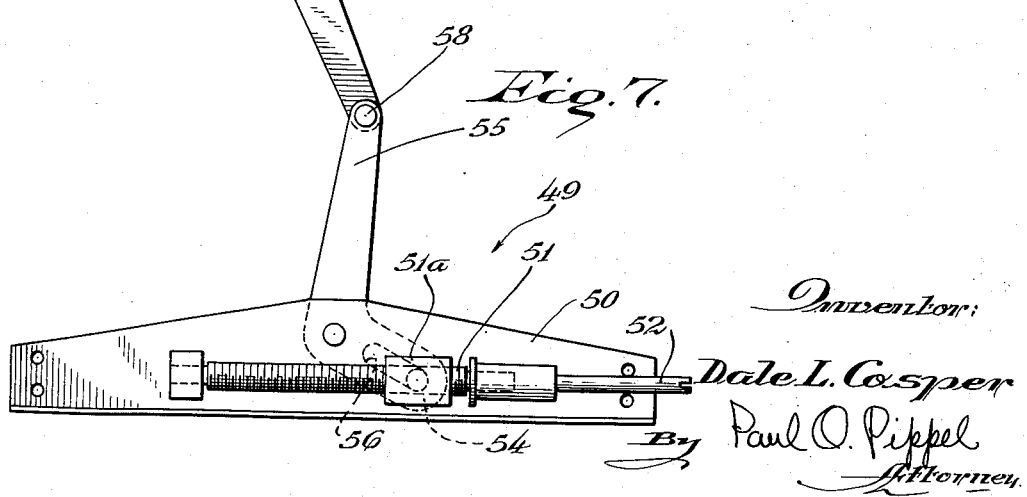
Inventor:
Dale L. Cosper
By Paul O. Pippel
Attorney Nov. 14, 1944.   D. L. COSPER   2,362,453
VEHICLE CAB
Filed Oct. 25, 1941    4 Sheets-Sheet 3

Inventor
Dale L. Cosper
By Paul O. Pippel
Attorney.

Nov. 14, 1944.   D. L. COSPER   2,362,453
VEHICLE CAB
Filed Oct. 25, 1941   4 Sheets-Sheet 4
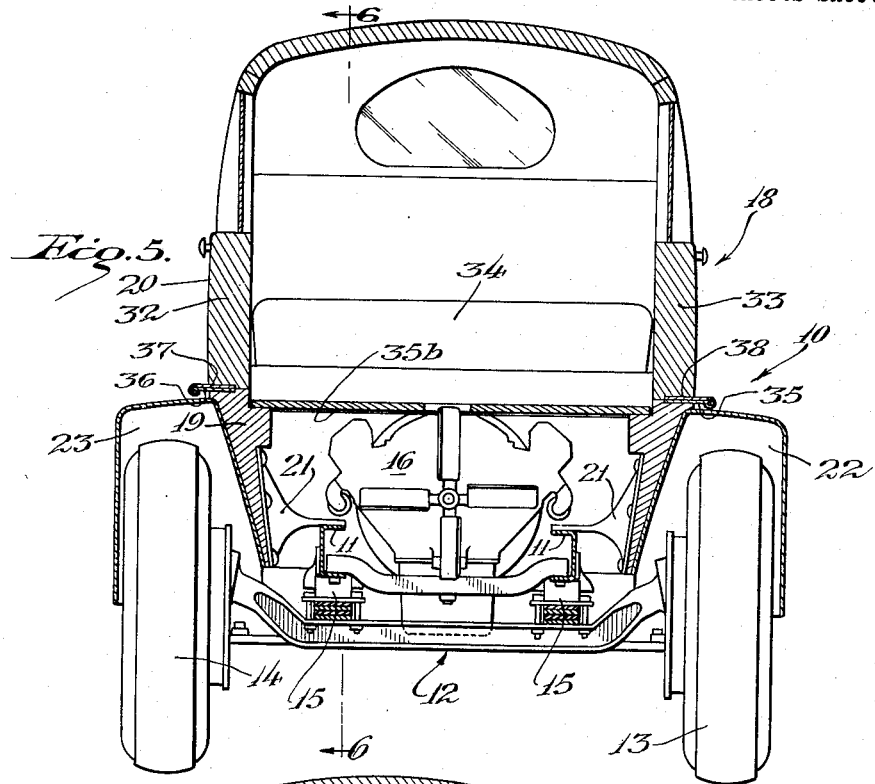
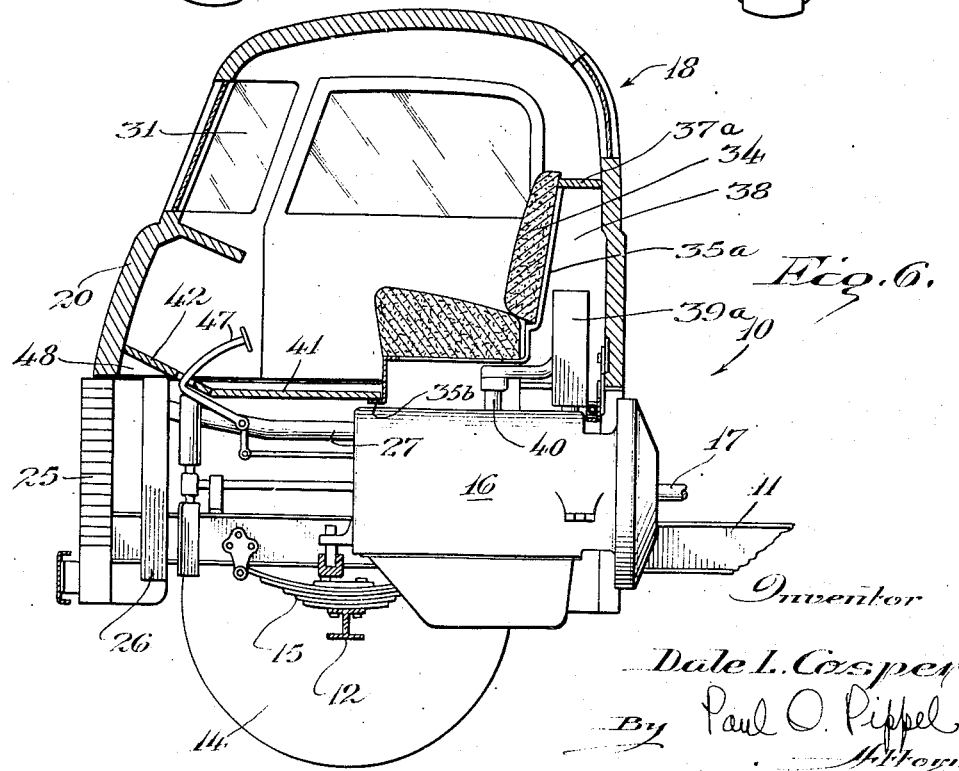

Patented Nov. 14, 1944

2,362,453

UNITED STATES PATENT OFFICE 2,362,453

VEHICLE CAB

Dale L. Cosper, Auburn, Ind., assignor to International Harvester Company, a corporation of New Jersey Application October 25, 1941, Serial No. 416,569

8 Claims. (Cl. 180—54)

This invention relates to automotive vehicles and is particularly concerned with a novel cab mounting therefor, by which the cab may be tilted to either side of the vehicle frame so that access may be had to that part of the vehicle beneath the cab.

Heretofore, movable cabs have been provided for automative vehicles, but they have been unsatisfactory in that they required many of the operating parts for the motor to be disconnected before the cab could be tilted. This is particularly undesirable, since when the motor need be repaired, it is desirable that the cab be tilted quickly and without disconnecting the control members for the motor.

It is therefore an important object of the present invention to provide a tiltable cab construction for an automotive vehicle which can be tilted without disturbing the control means for the vehicle.

An important object of the present invention is to provide a mounting, for a cab mounted over the engine, which will permit servicing of the engine and its accessories in their mounted position or for the removal of the engine and its accessories.

Another important object of the present invention is to mount a cab on an automotive vehicle frame by removable hinge means at opposite sides of the cab so that the cab may be tilted in either direction sideways for access to that part of the vehicle below the cab.

Another object of the present invention is to provide a cab construction by which the engine utilities need not be disturbed when the cab is tilted, the engine utilities being arranged so that they will fit into a suitable compartment provided in the cab construction.

Another object of the present invention is to provide a novel means for supporting the floor boards within the cab construction.

Another object of the present invention is to provide a novel control means for moving the cab to either side of its movable connection to the vehicle frame.

These and other objects and advantages of the present invention will be apparent to those skilled in the art after a careful consideration of the accompanying drawings.

In the drawings:

Figure 1 is a perspective view illustrating the novel tiltable cab construction in an operating position upon the wheel-supported vehicle frame;

Figure 2 is a perspective view illustrating the arrangement of parts carried by the vehicle frame when the cab is removed.

Figure 3 is a perspective view illustrating the cab in its raised position when it is moved about its movable connection to the frame to the left side of the vehicle;

Figure 5 is a sectional view taken along the line 5—5 of Figure 1;

Figure 6 is a sectional view taken along the line 6—6 of Figure 5; and

Figure 7 is a detail view on an enlarged scale of the novel control means for raising and lowering the cab.

Figure 4:
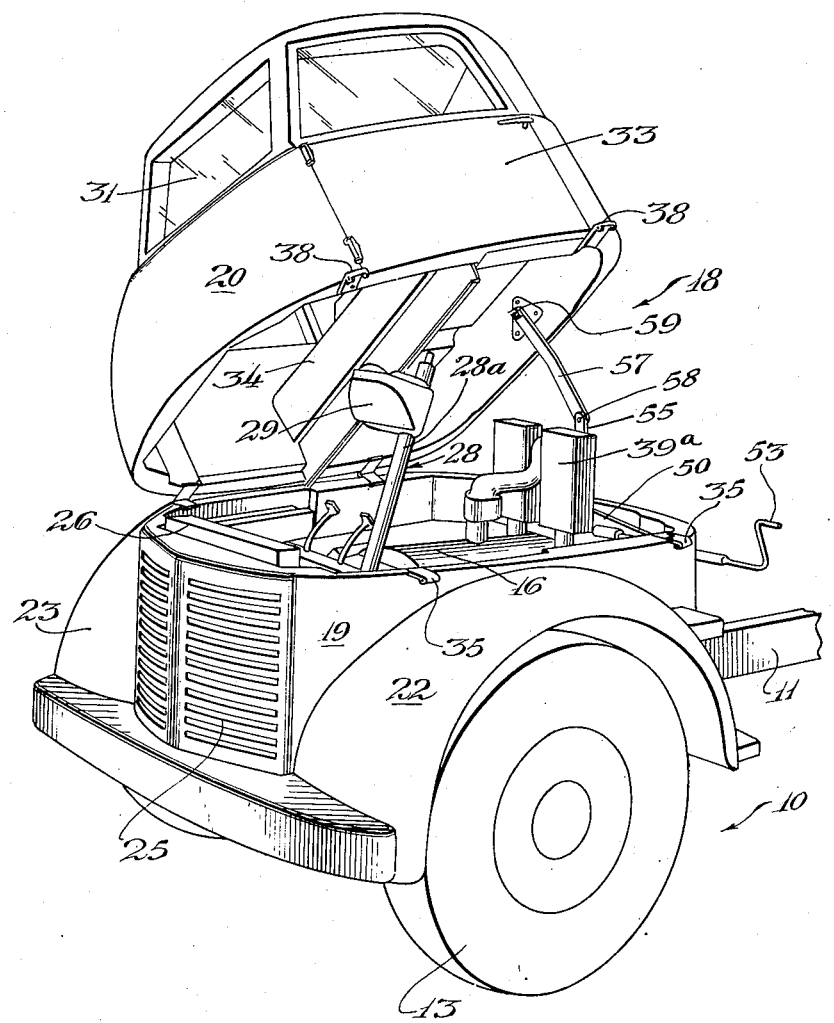
Figure 4 is a perspective view illustrating the cab when it is moved about its movable connection to the frame to the right side of the vehicle.

Referring now to the drawings and more particularly to Figures 1 and 2, it is to be noted that the construction disclosed therein comprises a wheel-supported frame 10 which comprises longitudinally disposed channel frame members 11 which are connected together in the usual manner. At the forward end of the channel members 11 is provided a transverse front axle structure 12, at the ends of which are rotatably mounted wheels 13 and 14. The front axle structure 12 is adapted to be connected to the longitudinal channel members 11 by means of springs 15. A motor 16, which in the present case is of the V-type, is mounted between the longitudinal channel members 13 and 14. A suitable drive shaft 17 extends from the motor 16 for driving the rear wheels of the vehicle. The cab construction is mounted around the motor 16.

The cab 18 comprises a lower cab section 19 and an upper cab section 20. The lower cab section 19 is adapted to be secured to the longitudinal channel members 11 by suitable brackets 21, as shown in Figure 5. At each side of the lower cab section and above the wheels 13 and 14 are secured fenders 22 and 23. A suitable bumper 24 connects the front end of the fenders 22 and 23. At the forward portion of the lower cab section 19 and between the fenders 22 and 23 is provided a grille 25, at the rear of which is positioned a radiator 26 that is mounted on the longitudinal channel members 11. Suitable conduits 27 connect the radiator 26 with the motor 16.

Referring now to Figure 2, it is to be noted that the motor cab section 19 terminates in the horizontal plane substantially at a level somewhat above the upper portions of the fenders 22 and 23. Most of the engine utilities are so arranged that they are below this horizontal plane. However, it is essential that the steering mechanism for the front wheels 13 and 14 project above this horizontal plane. A steering mechanism 28 accordingly is carried by one of the longitudinal channel members 11 and extends upwardly above the horizontal plane of the lower cab section 19, as shown in Figure 2. On the steering column 28a is mounted an instrument unit 29 which includes a speedometer, oil gauges, etc. By providing the instrument unit on the steering control means 28, none of these connections need ever be disturbed. A steering wheel 30 for the steering control means 28, however, is made removable.

The upper cab section 20 is adapted to fit the lower cab section 19. In other words, the lower cab surface terminates in a division line which may be in a substantial horizontal plane so that it may coincide with the lower cab section 19, as shown in Figure 1. The upper cab section 20 includes a front windshield 31, right- and left-hand doors 32 and 33, and a seat 34. Referring again to Figure 2, it will be noted that at each side of the lower cab section 19 there is provided a pivotal connection illustrated as a pair of alined hinges 35 and 36. The upper cab section 20 is also provided at each of its sides with a pair of alined hinges 37 and 38. When the upper cab section 20 is in normal position on the lower cab section 19, as illustrated in Figure 1, the lower hinges 35 and 36 are adapted to cooperate with the upper hinges 37 and 38. The hinges are connected by removable pins 39. The hinge means serves to hold the upper cab section on the lower cab section during operation, and upon removal of the pins at one side of the cab permits the upper part of the cab section to be tilted sideways with respect to the lower cab section.

As previously mentioned, the upper cab section 20 is provided with a seat 34. Referring now to Figure 6, it will be noted that the seat 34 is adapted to be carried by a suitable supporting structure 35a which extends downwardly and outwardly terminating in a flange portion 35b. A suitable member 37a is provided in the upper cab section between the rear wall thereof and the backrest portion of the seat 34. The back portion of the upper cab section 20 and the suppporting structure 35 form a space 38 for receiving an engine accessory 39a, which in this case is an air cleaner which is carried by a suitable support that is connected to the motor 16.

Removable floor-boards 41 and 42 are carried by the lower cab section 19. The supporting means therefor is clearly shown in Figures 2, 5, and 6. Referring to Figure 2, it will be seen that the lower cab section 19 is provided with recess portions 43 at each side thereof between the hinges 35 and 36. The recess portions comprise a horizontally disposed ledge 44 and an angularly disposed ledge 45. The floor-board 41 is removable, but, when in an operating position on the lower cab section, is adapted to rest at its ends on the ledge 44 and is supported at its rear edge by the flange 35b extending from the seat-supporting member 35. The usual brake and clutch pedals 46 and 47 are carried by the lower cab section 19, and, hence, the floor board 42 is so constructed that it may be inserted around the pedals 46 and 47 so that it may rest upon the ledges 45 in the lower cab section and a suitable ledge 48 provided at each side of the upper cab section 20.

The upper cab section is adjustable relative to the lower cab section. This adjustment is effected in the illustrated form by means of a control means carried by the lower cab section 19. The control means is illustrated in Figure 7, and is referred to in its entirety by the reference numeral 49, and comprises a plate member 50 which is adapted to be secured at its ends to the rear wall of the lower cab section directly above the rear end of the motor 16. On the plate member 50 is rotatably mounted a threaded member 51 from which extends a suitable shaft 52. The shaft 52 extends outwardly beyond the lower cab section 19, as shown in Figure 2, and is adapted to receive a crank 53. On the threaded member 51 is threaded a part 51a from which extends a pin 54. Intermediate the ends of the plate member 50 is pivotally mounted a bell-crank 55 which at its lower end is provided with a suitable slot 56 that is adapted to receive the pin 54. The upper end of the bell-crank 55 is connected to a suitable link 57 by a bolt 58, and the other end of the link 57 is connected to the rear wall of the upper cap section 20 by means of a bolt 59. Upon rotating the shaft 52, the part 53 is moved along the threaded member 51 which in turn moves the bell-crank 55 and the link 57.

In the event that access must be had to any part of the vehicle below the cab, the floor-boards 41 and 42 are first removed from their positions within the cab. Next, the steering wheel 30 is removed from the steering column 28a. These are the only parts that need be removed in order that the cab may be tilted to either side about its movable connection to the lower cab section. Next, the removable hinge pins 39 at one side of the cab, that is, at the opposite side of the direction of tilt, are removed from the hinges. Then the crank 53 is rotated manually to move the links 55 and 57 to move the upper cab section 20 about the remaining hinge pins connecting the upper cab section 20 to the lower cab section 19. For example, Figure 4 illustrates the position of the cab when the hinge pins at the left side of the machine have been removed and the cab tilted to the right, and Figure 3 illustrates the position of the upper cab section 20 when the hinge pins 39 at the right side of the machine have been removed. By providing a means by which the upper cab section 20 may be tilted laterally to either side of the lower cab section 19, it will be appreciated that the mechanic may have ready access to either side of the motor, which is particularly advantageous when the motor is of the V-type, and then if desired the entire upper cab section 20 may be entirely removed from the lower cab section 19 by simply removing the hinge pins 39 at each side of the machine. After the motor has been repaired and it is desired to replace the upper cab section 20 in its former position on the lower cab section 19, the crank 53 is then rotated in the opposite direction which lowers the upper cab section 20 onto the lower cab section 19. The hinge pins 39, the floor-boards 41 and 42, and the steering wheel 30 are then replaced to their positions, and the vehicle is again ready for operation.

In view of the foregoing description, it should be apparent that a novel tiltable cab construction has been provided for an automotive vehicle which may be readily tilted to either side of the vehicle so that access may be had to that part of the vehicle below the cab. Only a minimum of parts need be removed to tilt the upper cab section 20, and these parts do not in any way require extensive manipulation to return them to their former positions. By so mounting the cab on the vehicle access may be had to either side of the V-type engine. Novel means have also been provided for receiving the engine utilities, which when the upper cab section is in an operating position with the lower cab section, may slip into a suitable recess provided in the upper cab section and need never be disconnected when it is desired to tilt the upper cab section.

While various changes and modifications may be made in the structure disclosed herein, it is to be understood that the invention is to be limited only within the terms of the appended claims.

What is claimed is:

1. A cab construction for an automotive vehicle frame comprising in combination a lower cab section mounted on the frame, said section terminating in a substantially horizontal plane above said frame, a motor carried by the frame within said lower cab section, an upper cab section positioned above the lower cab section, removable hinge means connecting opposite sides of the cab with the opposite sides of the lower cab section, said removable hinge means being so positioned and arranged that the upper cab section may be moved sideways in either direction with respect to the lower cab section, and means carried by the lower cab section and operably connected to the upper cab section for moving said upper section.

2. A cab construction for an automotive vehicle having a frame, comprising in combination a lower cab section mounted on the frame, a motor carried by the frame and positioned within the lower cab section, steering control means carried by said lower cab section, control means for the motor carried by the steering control means, engine accessories projecting upwardly at the rear of the engine adjacent the rear portion of the lower cab section, an upper cab section movably mounted at opposite sides on the lower cab section, said upper cab section having doors positioned at opposite sides thereof, an operator's station carried by said upper cab section, there being a space between the operator's station and the rear portion of the upper cab section for receiving said engine accessories when the upper cab section is in normal position on the lower cab section, adjustable means carried by the lower cab section and operably connected to the upper cab section for moving the upper cab section sideways, and means carried by the lower cab section and the upper cab section on which a floor may rest when the upper cab section is in normal position with respect to the lower cab section.

3. A cab construction for a wheel-supported automotive vehicle frame comprising in combination a lower cab section carried by the frame, fenders mounted over the wheels and secured to said lower cab section, said section terminating in a horizontal plane substantially at the level of the upper portions of the fenders, an engine carried by said frame and positioned within the lower cab section, a radiator positioned at the forward portion of said lower cab section, a grille ahead of said radiator, engine accessories projecting upwardly at the rear of said engine adjacent the rear portion of said lower cab section, and an upper cab section mounted above said lower cab section and forming a continuation of the vertical walls thereof, said upper cab section carrying a seat, a steering column carried by the frame and extending upwardly from the lower cab section into the upper cab section, floor-boards extending across the front portion of one cab section ahead of the seat therein, said floor-boards being removable, means for supporting the rear edge of said floor-boards from one cab section, removable hinge means connecting the upper section of the cab to the lower section of the cab along each side thereof, and lifting means positioned between the lower cab section and the upper cab section adjacent the central portion of the rear of said section and effective to tilt the upper section of the cab in either direction upon removal of the hinges at one side thereof, said seat having a back portion spaced from the rear wall of the upper cab section to provide a space for the upwardly extending engine accessories.

4. A cab construction for automotive vehicles comprising in combination a wheel-supported frame, a lower cab section mounted on the frame, said section terminating in a substantially horizontal plane above said frame, a motor carried by said frame within said lower cab section, a steering column carried by the frame and extending upwardly therefrom, control means for the automotive vehicle carried by said steering column, an upper cab section mounted above said lower section and forming a continuation of the vertical walls thereof, said upper cab section being provided with a seat, removable hinge means connecting the upper section of the cab to said lower cab section at each side thereof whereby said cab may be tilted sideways to either side of the lower cab section, an extensible lifting means between the lower cab section and the upper cab section for moving said upper cab section, floor-boards supported by the lower cab section, and means extending from said seat in the upper cab section for supporting the rear portion of said floor-boards.

5. A front end and cab construction for automotive vehicles comprising in combination with a frame and a wheeled axle at the forward end of said frame, a lower cab section mounted on the frame, fenders mounted over the wheels and secured to the lower cab section, said section terminating in a horizontal plane substantially at the level of the upper portions of the fenders, a V-type engine mounted in said frame, the opposing banks of cylinders lying along the sides of the lower cab section and terminating below said horizontal plane, a radiator positioned at the forward portion of said cab section, a grille ahead of said radiator, engine accessories projecting upwardly at the rear of said engine and adjacent the rear portion of the lower body section, an upper cab section mounted above said lower section and forming a continuation of the vertical walls thereof, said upper cab section carrying a seat, a steering column secured to the frame and extending upwardly into the upper cab section, floor-boards extending across the front portion of the upper cab section ahead of the seat therein, said floor-boards being removable, removable hinge means connecting the upper section of the cab to the floor section along each side thereof, and lifting means between the lower cab section and the upper cab section adjacent the central portion of the rear of said sections, said means being effective to tilt the upper section of the cab in either direction upon removal of the hinges at the sides thereof, said seat having a back portion spaced from the rear wall of the upper cab section to provide a space for the upwardly extending engine accessories.

6. A cab construction for an automotive vehicle having a frame, comprising in combination a lower cab section mounted on the frame and having walls, a motor carried by the frame and positioned within the lower cab section, steering control means within the lower cab section, an engine accessory projecting upwardly adjacent one wall of the lower cab section, an upper cab section removably mounted on the lower cab section, an operator's station carried by said upper cab section, there being a space between the operator's station and a portion of the upper cab section for receiving said engine accessory when the upper cab section is in normal position on the lower cab section, adjustable means carried by one cab section and operably connected to the other cab section for moving the upper cab section with respect to the lower cab section, and means carried by one of the sections on which a floor may rest when the upper cab section is in normal position with respect to the lower cab section.

7. A cab construction for an automotive vehicle frame comprising in combination a lower cab section mounted on the frame, said section terminating in a substantially horizontal plane above said frame, a motor mounted on said frame within said lower cab section, an upper cab section connected by removable hinges to both sides of said lower cab section, said hinges being so positioned and arranged that the cab may be tilted to either side, toggle means contrally disposed between the upper and lower cab sections for moving the upper cab section, and means for operating said toggle means extending from one side of the vehicle and operable to tilt the cab in either direction depending on the hinges removed.

8. A cab construction for an automotive vehicle frame comprising in combination a lower cab section mounted on the frame, said section terminating in a substantially horizontal plane above said frame, a motor carried by the frame within said lower cab section, an upper cab section positioned above the lower cab section, removable hinge means connecting opposite sides of the cab with the opposite sides of the lower cab section, said removable hinge means being so positioned and arranged that the upper cab section may be moved sideways in either direction with respect to the lower cab section, and single extensible means connected between the cab sections intermediate the sides thereof operable to tilt the cab in either direction depending upon which hinge means is removed.

DALE L. COSPER.